United States Patent

[11] 3,580,052

| [72] | Inventor | James Roger Young<br>Rexford, N.Y. |
|---|---|---|
| [21] | Appl. No. | 868,877 |
| [22] | Filed | Oct. 23, 1969 |
| [45] | Patented | May 25, 1971 |
| [73] | Assignee | General Electric Company |

[54] DISCHARGE GAGE FOR HELIUM LEAK DETECTOR USE
6 Claims, 4 Drawing Figs.

[52] U.S. Cl. ................................................... 73/40.7,
324/33
[51] Int. Cl. ........................................................ G01m 3/04
[50] Field of Search........................................... 73/40.7;
250/83.6; 313/7; 324/33

[56] References Cited
UNITED STATES PATENTS

| 2,197,079 | 4/1940 | Penning.......................... | 324/33 |
| 2,768,061 | 10/1956 | Cook et al. .................... | 324/33UX |
| 2,863,315 | 12/1958 | Penning.......................... | 73/40.7 |
| 2,897,437 | 7/1959 | Briggs et al. .................. | 324/33 |
| 3,324,729 | 6/1967 | Vanderslice.................... | 73/40.7 |

*Primary Examiner*—Louis R. Prince
*Assistant Examiner*—William A. Henry, II
*Attorneys*—Paul A. Frank, John F. Ahern, Julius J. Zaskalicky, Frank L. Neuhauser, Oscar B. Waddell and Joseph B. Forman

ABSTRACT: A Penning-type discharge gage for a leak detector using a mass spectrometer and helium as a probe gas uses graphite cathodes to eliminate the helium memory associated with cathodes consisting of other materials.

INVENTOR:
JAMES ROGER YOUNG,
by Paul A. Frank
HIS ATTORNEY

Patented May 25, 1971

INVENTOR:
JAMES ROGER YOUNG,
by Paul A. Frank
HIS ATTORNEY

DISCHARGE GAGE FOR HELIUM LEAK DETECTOR USE

My invention relates to leak detection apparatus and in particular to ionization gauges used in such apparatus.

Apparatus employed to detect leaks in objects conventionally consist of a conduit connected to the object and a mass spectrometer and a discharge gauge connected to the conduit. The object is sprayed with a probe gas such as helium. Amplifiers and recorders associated with the mass spectrometer measure the strength of the output signal of the mass spectrometer leak detector. Such apparatus customarily employs a cold cathode discharge gauge for measuring pressure in the mass spectrometer region of the leak detector. Such gauges which are also known as Penning discharge gauges employ a collimating magnetic field which forces electrons to traverse a long path before they reach the collecting electrode. In traversing such long path, they encounter and ionize molecules of helium gas in the interelectrode region even though this gas may be of very low pressure. These gauges moreover, because they employ cold cathodes, have the advantage of being rugged with no filaments to burn out, inexpensive, and easy to repair. Because they use a cold cathode, they may also be operated at very high pressures without damage.

One of the problems encountered in helium mass spectrometer leak detectors is that after the leak detector has been exposed to the helium for a short time in locating a leak, the residual helium signal after exposure may be quite large. Often such residual helium signal will be present several hours after the apparatus has been exposed to a large helium leak. This residual signal is caused by positive helium ions which strike the cathode and penetrate a short distance into the cathode material. Since the diffusion rate of helium into metals is quite low, any helium ions which penetrate the few atomic layers into the cathode are trapped. After a quantity of helium has been pumped by such a discharge gauge helium ions striking the cathode dislodge some of the helium that has been previously pumped. Eventually the cathodes become saturated so that as much helium is regurgitated by the cathode as is pumped. If the gauge is turned off, much of the helium which has been previously pumped will remain trapped in the cathodes. However, if the gauge is operated while helium is not present, some of this previously pumped helium will be evolved, resulting from the localized heating of the cathodes due to ion bombardment and also due to the sputtering away of metal which covers the trapped helium. This evolved helium produces an increase in partial pressure of helium in the leak detector and consequently a spurious residual output signal which decays slowly with time. The presence of such a residual helium signal is an undesirable characteristic in any leak detector application and operates to prevent or discourage the use of such apparatus in automatic repetitive applications.

It is a primary object of my invention to provide new and improved apparatus employing a helium tuned mass spectrometer for detecting leaks which eliminates the presence of a residual helium output signal in the apparatus.

It is another object of my invention to provide a new and improved Penning discharge device having cathodes which do not trap helium ions.

It is another object of my invention to provide a new and improved discharge gauge which has a low helium memory characteristic.

A principal feature of my invention is the employment in apparatus for detecting leaks in an object and using a mass spectrometer connected to the object of a discharge gauge employing cold cathodes in which the cathodes are formed of carbon.

The novel features believed characteristic of the invention are set forth in the appended claims. The invention itself, however, together with further objects and advantages thereof may best be understood by referring to the following description taken in connection with the accompanying drawings in which FIG. 1 is a schematic diagram of a helium mass spectrometer leak detector employing a Penning discharge gauge of my invention;

Figure 1:
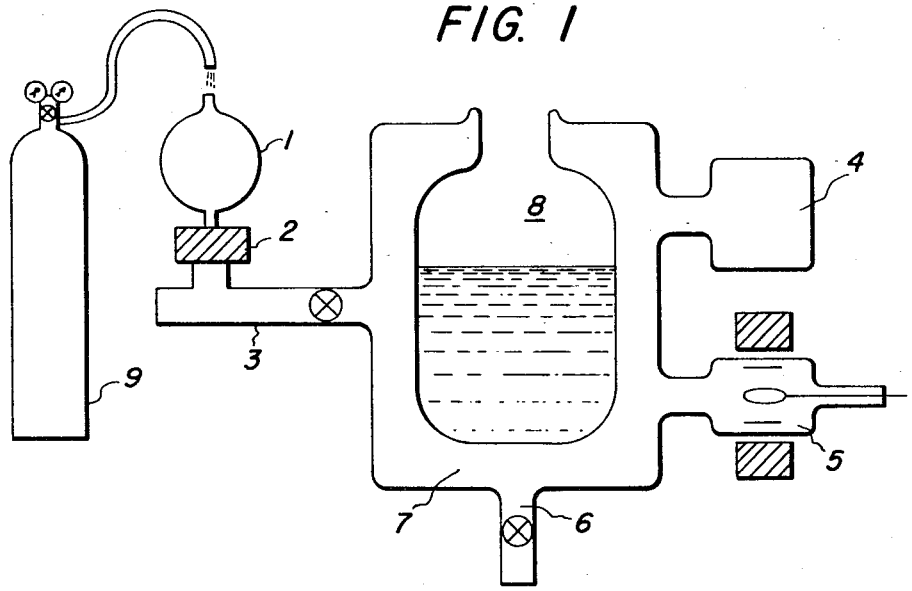

In FIG. 1, an object 1 to be tested for leaks is connected by means of a coupling 2 and a conduit 3 to a leak detector which comprises a helium sensor such as a mass spectrometer 4, and a discharge gauge 5. The conduit 3 is evacuated by means of a pump (not shown) connected to an outlet conduit 6. The conduits 3, 6 and the elements 4 are all connected to a chamber 7 which is maintained at a low pressure by means of a pump (not shown) and a refrigerant 8 such as liquid nitrogen. A source of probe gas, for example helium 9, is conventionally used for spraying the object 1 when it is being tested for a leak.

Figure 3:
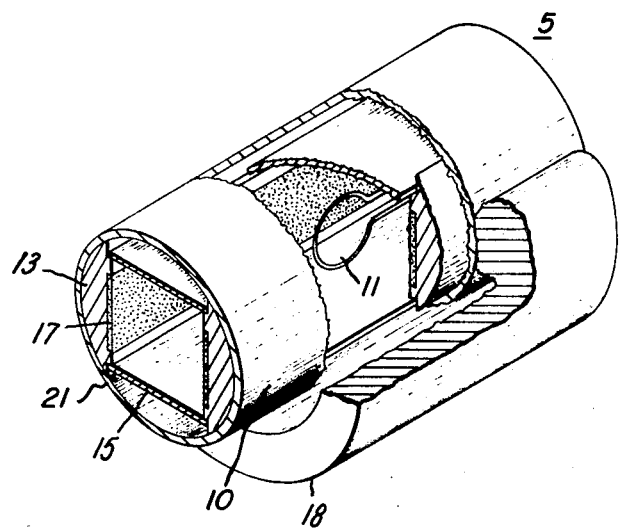
FIG. 3 is a perspective view of a portion, partly in section, of the gauge of FIG. 2.
Figure 2:
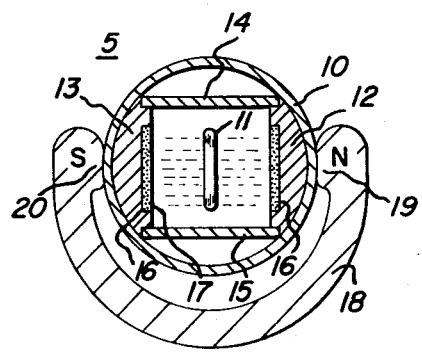
FIG. 2 is a cross-sectional view of the Penning discharge gauge of FIG. 1.

The Penning-type discharge gauge 5 illustrated in FIG. 2 comprises a tubular nonmagnetic enclosing member 10 having a wire ring anode 11 positioned substantially centrally of member 10. A pair of curved, opposed, spaced ferromagnetic pole members 12, 13 are positioned within tubular enclosing member 10 and engage the inner wall of member 10. A pair of spacers 14, 15 of a suitable nonmagnetic material such as, for example, copper, maintain pole members 12, 13 in a position such that their inner surfaces are parallel with the vertically arranged wire ring anode 11. Each pole members 12, 13 contains a central recess 16 in which is positioned a carbon cathode 17. A collimating magnetic field traverses anode 11 and extends between pole members 12, 13, the field being established by an external permanent magnet 18 having poles 19, 20 arranged to cooperate with pole members 12, 13. Permanent magnet 18 is thus C-shaped and may be formed of any suitable magnetic material such as Alnico V. The device 5 is shown in a perspective view in FIG. 3 which illustrates that tubular nonmagnetic member 10 has an open end 21 which may be welded or otherwise connected to region 7. For this purpose, member 10 is formed of a suitable nonmagnetic metal such as, for example, stainless steel. After being so welded or connected to region 7, gases within that region pass readily to the region surrounding anode 11, discharge gauge 5 functioning as as ion pump.

During operation, positive ions in the discharge bombard the cathode with energies dependent upon the voltage between the anode and the cathode. When helium is used as the probe gas, some of the positive helium ions strike the cathodes and penetrate a short distance into the cathode material. I have found that after a quantity of helium has been pumped, incident helium ions dislodge some of the helium that has been pumped previously. When the cathodes are formed of a metal which absorbs the helium, after a quantity of helium has been pumped, incident helium ions dislodge some of the helium that has been previously pumped. Finally, the cathodes become saturated so that as much helium is regurgitated as is pumped. If the gauge is turned off, much of the helium which was previously pumped still remains in the cathodes. If the gauge is then operated with helium not present, some of the previously pumped helium will be evolved because of the localized heating of the cathodes due to ion bombardment and also due to the sputtering away of metals which cover the trapped helium.

In accordance with my invention, the regurgitation of helium ions is obviated by forming cathodes 16 of a material such that the helium ions are not absorbed but instead diffuse into and out of the material. For this purpose I employ carbon as the material for the cathode, and preferably, porous carbon or graphite.

Figure 4:
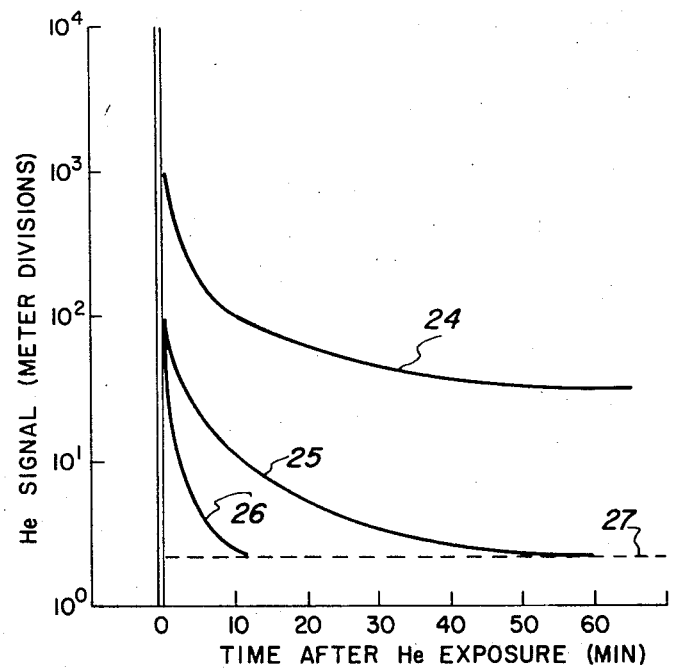
FIG. 4 is a group of curves illustrating the results of the operation of the invention.

The difference in the operation of a Penning discharge device having carbon cathodes in accordance with my invention as contrasted with devices having cathodes of other metals, is best illustrated by reference to the curves of FIG. 4.

In this figure, the helium signal is plotted as ordinate, with the time after helium exposure in minutes as abscissa. Curve 24 is that obtained when the cathode is formed of metals other than carbon, in particular, the metals being aluminum, iron, titanium, and tungsten. Curve 25 illustrates the helium signal response with time when the cathodes are formed of colloidal carbon. Curve 26 illustrates the same response when the cathodes are formed of 60 percent porous graphite. The curves of FIG. 4 illustrate that the results obtained for cathodes of iron, aluminum, tungsten, and titanium are almost identical. On the other hand, colloidal graphite cathodes reduce the helium memory by a factor of about 10 as is illustrated by curve 25. Also, 60 percent porous graphite cathodes provided a lower helium memory by a factor of about 100, as is illustrated by curve 26. The lower portion of the curves of FIG. 4, i.e., the region below line 27, represent the helium signal observed when gauge 5 is not operating during the run.

It is obvious from the results illustrated in FIG. 5 that helium memory in a leak detector can be reduced significantly by incorporating a discharge gauge with colloidal graphite or porous graphite cathodes. With such a construction, the helium memory effect varies little from that obtained when the gauge is not turned on. An important advantage of the use of the carbon cathode discharge gauge is that it permits application of the apparatus to rapid cycle leak detection applications with a minimum of background due to helium memory in the gauge.

While I have shown and described in a particular embodiment of my invention and the form of an application of gauge 5, it will be obvious to those skilled in the art that various changes and modifications including conventional operating voltage and output connections can be made in the structure and application of gauge 5.

What I claim as new and desire to secure by Letters Patent of the United States is:

1. An apparatus for detecting leaks in an object and in which the object is exposed to a flow of helium, such apparatus including
   a conduit connected to the object,
   vacuum pump means and a mass spectrometer connected to said conduit,
   a discharge gauge connected to said conduit, said gauge comprising a pair of spaced cold cathodes and an anode positioned between said cathodes, and
   means for passing a magnetic field transversely of said cathodes, the improvement which consists of forming such cathodes of carbon.

2. In the apparatus of claim 1 a discharge gauge having cathodes formed of porous carbon.

3. In the apparatus of claim 1 a discharge gauge having cathodes formed of colloidal carbon.

4. A Penning discharge device comprising
   a tubular nonmagnetic member,
   an anode positioned substantially centrally of said member,
   a pair of curved, opposed, space ferromagnetic pole members in said nonmagnetic member and engaging the inner wall thereof, each of said pole members having a central recess,
   a permanent magnet outside said tubular member and having poles cooperating with said pole members, and
   a cathode positioned within each recess, said cathode consisting of carbon.

5. The device of claim 4 in which the cathode consists of porous carbon.

6. The device of claim 4 in which the cathode consists of colloidal carbon.